(12) United States Patent
Matthews et al.

(10) Patent No.: US 7,893,131 B2
(45) Date of Patent: Feb. 22, 2011

(54) FAST DRY, SHELF STABLE AQUEOUS COATING COMPOSITION COMPRISING A PHOSPHORUS ACID POLYMER

(75) Inventors: Mary Anne R. Matthews, Willow Grove, PA (US); Donald Craig Schall, Lansdale, PA (US)

(73) Assignee: Rohm and Haas Company, Philadelphia, PA (US)

( * ) Notice: Subject to any disclaimer, the term of this patent is extended or adjusted under 35 U.S.C. 154(b) by 100 days.

(21) Appl. No.: 12/319,273

(22) Filed: Jan. 5, 2009

(65) Prior Publication Data

US 2009/0176127 A1    Jul. 9, 2009

Related U.S. Application Data

(60) Provisional application No. 61/010,214, filed on Jan. 7, 2008.

(51) Int. Cl.
*F21V 7/22* (2006.01)
(52) U.S. Cl. .......................................... 523/172
(58) Field of Classification Search .................. 523/172
See application file for complete search history.

(56) References Cited

U.S. PATENT DOCUMENTS

2004/0131788 A1    7/2004  Hermes

2005/0222299 A1    10/2005  Garzon et al.
2008/0115900 A1    5/2008  Haigh et al.

FOREIGN PATENT DOCUMENTS

| JP | 2003096143 A | 4/2003 |
| JP | 2005132862 A | 5/2005 |
| JP | 2006008785 A | 1/2006 |

*Primary Examiner*—Edward J Cain
(74) *Attorney, Agent, or Firm*—Andrew E C Merriam

(57) ABSTRACT

The present invention provides fast drying aqueous compositions, suitable for use in making roadway markings, as well as the road markings made therefrom, the compositions comprising one or more anionically stabilized binder having a phosphorus acid functional polymer component having a glass transition temperature (Tg) range of from −30° C. to 60° C. and a polyfunctional amine component in combination with one or more volatile base in an amount sufficient to stabilize the composition by at least partially deprotonating the polyfunctional amine, and one or more phosphorus acid surfactant, such as an alkyl ethoxylated phosphate. Further, the present invention provides two component compositions comprising the above composition as one component and a second component comprising an absorber and/or the polyfunctional amine component. The fast-drying compositions are viscosity stable and provide wear resistant fast dry coatings even in humid application conditions.

10 Claims, No Drawings

US 7,893,131 B2

FAST DRY, SHELF STABLE AQUEOUS COATING COMPOSITION COMPRISING A PHOSPHORUS ACID POLYMER

This application claims the benefit of priority under 35 U.S.C. §119(e) of U.S. Provisional Patent Application No. 61/010,214 filed on Jan. 7, 2008.

The present invention relates to fast drying aqueous compositions for use in traffic paint comprising an aqueous binder component comprising one or more phosphorus acid functional copolymer, and to the roadway markings formed using such compositions. More particularly, the present invention relates to fast drying aqueous compositions comprising an anionically stabilized binder comprising a phosphorus acid functional polymer component and a polyfunctional amine component, one or more volatile base, and one or more phosphorus acid surfactant.

Aqueous road marking paints are desirable substitutes for solvent-based road marking paints for reducing the adverse impact of volatile organic compounds (VOC's) on the environment and on worker safety. However, aqueous road marking paints do not dry as quickly as solvent-based road marking paints and the problem with inadequate drying speed become especially troublesome in applications at high humidity, as well as low temperature or low air flow conditions like those encountered in applying road markings in the summer or in tropical climes.

U.S. Patent Application Publication no. 2005/0222299A1, to Garzon, discloses aqueous coating compositions having a pigment and an aqueous emulsion copolymer having a glass transition temperature (Tg) of from −20° C. to 60° C. and comprising as polymerized units at least one ethylenically unsaturated nonionic monomer, e,g, an alkyl (meth)acrylate, and from 0.1 to 10 wt. %, based on the dry weight of the copolymer, and an ethylenically unsaturated phosphate monomer or salt thereof. The Garzon aqueous compositions provide coatings having desirable scrub resistance. However, the Garzon compositions fail to exhibit a fast enough dry time for use in making road markings, especially in high humidity conditions. Further, the Garzon coatings fail to exhibit the necessary water washout resistance to make them suitable for use in making road markings.

The present applicants have endeavored to solve the problem of providing a low VOC composition that is fast-drying, wear resistant and viscosity stable and that can be used to make road markings in high humidity conditions.

STATEMENT OF THE INVENTION

According to the present invention, fast drying aqueous compositions comprise (i) one or more anionically stabilized binder having a phosphorus acid functional polymer component having a glass transition temperature (Tg) range of from −30° C. to 60° C. and a polyfunctional amine component, (ii) one or more volatile base in an amount sufficient to stabilize the composition by at least partially deprotonating the polyfunctional amine, and (iii) one or more phosphorus acid surfactant, such as an alkyl ethoxylated phosphate. The amount of volatile base should be sufficient to deprotonate from 20 mole % to 100 mole % of the amine functional groups on the polyfunctional amine component.

The anionically stabilized binder comprises a phosphorus acid functional polymer component that is stabilized against reaction with the polyfunctional amine component by deprotonation of the polyfunctional amine component. The phosphorus acid functional polymer component and the polyfunctional amine component can comprise part of the same polymer, or can be separate molecules in admixture in a single component comprising volatile amine, or can exist as separate components for application.

The phosphorus acid functional polymer component may be any one or more phosphorus acid functional polymer, or any such polymer comprising one or more functional groups chosen from carboxylic acids, salts thereof, anhydrides, salts thereof, aldehydes, amides, amine functional groups in addition to any of the foregoing functional groups, mixtures thereof and combinations thereof.

The polyfunctional amine component may be any one or more polymer chosen from polymers containing pendant amine functionality and vinylamine polymers, hydrophobic polyamine functional emulsion polymers, copolymers thereof further containing phosphorus acid functional groups, and mixtures thereof.

The one or more volatile base, for example, a volatile amine, is present in amounts sufficient to raise the pH to 7.5 or higher and to ensure that the polyfunctional amine component is at least partially in a non-ionic state (deprotonated), i.e. at least 20 mole % of the amine groups in the polyfunctional amine component are deprotonated.

In another embodiment, the fast-drying aqueous compositions may comprise two component compositions. Two component fast-drying aqueous compositions comprise a binder component of the anionically stabilized binder, optionally, the polyfunctional amine component, and one or more volatile base in an amount sufficient to at least partially stabilize the composition by deprotonating the polyfunctional amine, and an absorber component, optionally along with the polyfunctional amine component as the second component if it is not included in the binder component.

The present invention also provides coatings and roadway markings and methods of making the same from the fast drying aqueous compositions. The methods comprise applying the compositions to a substrate, including, for example, a road, and drying to form a film.

All ranges recited are inclusive and combinable. For example, a copolymerized monomer proportion that ranges from 0.05 wt. % or more and that may range up to 5 wt. %, preferably up to 2.5 wt. %, more preferably, 1 wt. % or more or, more preferably, up to 2 wt. %, based on the dry weight of the copolymer would include copolymerized monomer proportions of from 0.05 wt. % to 5 wt. %, or of from 0.05 wt. % to 1 wt. %, or of from 0.05 wt. % to 3.0 wt. %, or of from 0.05 wt. % to 2.5 wt. %, or of from 1 wt. % to 5 wt. %, or of from 1 wt. % to 2 wt. %, or of from 1 wt. % to 2.5 wt. %.

Unless otherwise indicated, all pressure units are standard pressure and all temperature units refer to room temperature (~25° C.).

All phrases comprising parentheses denote either or both of the included parenthetical matter and its absence. For example, the phrase "(meth)acrylate" includes, in the alternative, acrylate and methacrylate; likewise, the phrase "(co)polymer" refers, in the alternative, to a polymer, a copolymer, a terpolymer, a tetrapolymer, a pentapolymer, etc.

As used herein, the term "average particle size" means the particle size as determined by CHDF (capillary hydrodynamic fractionation) with a Matec CHDF-2000 (Matec Applied Sciences, Northborough, Mass.), or by light scattering (LS) with a BI-90 particle size analyzer, Brookhaven Instruments Corp. (Holtsville, N.Y.).

As used herein, the term "component" means any composition comprising the specified ingredient. For example, a polyfunctional amine component may be one polymer, it may comprise two polymers, or it may comprise an aqueous dispersion of a polymer that also has phosphorus acid functional groups and carboxylic acid functional groups.

As used herein, the term "fast-drying aqueous composition" refers to compositions that, when applied to a substrate, form a film having a dry through time such that a film thereof having a wet coating thickness of 330 microns displays a dry-through time of less than two hours at 90 percent relative humidity at 23° C. The term "fast-drying aqueous binder composition" refers to compositions that, when applied to a substrate, form a film having a dry-through time conforming to the definition of "fast-drying"; thus, one component fast-drying aqueous compositions comprise fast-drying aqueous anionically stabilized binders and volatile base.

As used herein, the term "(meth)acrylate" means acrylate, methacrylate, and mixtures thereof and the term "(meth)acrylic" used herein means acrylic, methacrylic, and mixtures thereof.

As used herein, unless otherwise indicated, the phrase "GPC number average molecular weight" refers to the number average molecular weight as measured by gel permeation chromatography (GPC) against a polyacrylic acid (PAA) standard of a copolymer that is hydrolyzed in KOH. GPC is described in detail on page 4, Chapter I of *The Characterization of Polymers* published by Rohm and Haas Company, Philadelphia, Pa., in 1976, utilizing polymethyl methacrylate as the standard.

As used herein, the term "road" includes any indoor or outdoor solid surface that is or may be constantly or intermittently traveled on by pedestrians, moving vehicles, tractors, or aircraft continuously. Some non-limiting examples of a "road" include highways, streets, driveways, sidewalks, runways, taxiing areas, tarmac areas, parking lots.

As used herein, unless otherwise indicated, the term "Tg" or "glass transition temperature" of a polymer refers to the Tg of a polymer calculated by using the Fox equation (T. G. Fox, *Bull. Am. Physics Soc.*, Volume 1, Issue No. 3, page 123 (1956). The Tg of various homopolymers may be found, for example, in Polymer Handbook, edited by J. Brandrup and E. H. Immergut, Interscience Publishers.

As used herein, the term "volatile organic compound" (VOC) is defined as a carbon-containing compound that has a boiling point below 280° C. at atmospheric pressure.

As used herein, the phrase "wt. %" stands for weight percent.

Fast drying aqueous compositions of anionically stabilized binder having phosphorus acid functional polymer component and polyfunctional amine component, volatile base in an amount sufficient to stabilize the anionically stabilized binder, and one or more phosphorus acid surfactant, provide viscosity stable coating compositions having faster dry times than compositions presently known. In addition, the fast drying aqueous compositions have better wet adhesion to glass and improved hiding capacity.

The phosphorus acid functional polymer component and the polyfunctional amine component of the anionically stabilized binder can comprise part of the same copolymer, or may comprise-separate molecules in admixture, or may comprise separate molecules in two separate components.

The phosphorus acid functional polymer component may be any one or more phosphorus acid functional polymer having a glass transition temperature (Tg) range of from −30° C. to 60° C., preferably, 0° C. or more and to 50° C. or less. The phosphorus acid functional polymer may have a number average molecular weight in the range of 1,000 to 1,000,000, preferably 10,000 to 800,000.

Suitable amounts of phosphorus acid groups in the phosphorus acid functional polymer may range from 0.03 wt. % or more and up to 5 wt. %, preferably up to 3 wt. %, more preferably, 1 wt. % or more or, more preferably, up to 2.5 wt. %, based on the dry weight of the binder. Further, the phosphorus acid functional polymer may comprise additional functional groups chosen from carboxylic acids, salts thereof, anhydrides, salts thereof, aldehydes, amides, any of the foregoing functional groups and, in addition, amine functional groups, mixtures thereof and combinations thereof.

The phosphorus acid functional polymer can be selected from any film-forming polymer having phosphorus acid functional groups, and, preferably, a polymer further comprising functional groups that are anionic, such as, for example, carboxylic acids, anhydrides, aldehydes and amides. The phosphorus acid functional polymer of the anionically stabilized binder is stabilized by surfactants, including anionic surfactants, non-ionic surfactants, or mixtures of anionic and non-ionic surfactants.

The phosphorus acid functional polymer component may be any one or more phosphorus acid functional polymer, such as a polymer comprising one or more functional group chosen from carboxylic acid, anhydride, any salt thereof, aldehyde, amide, amine, mixtures thereof and combinations thereof, or a polymer stabilized with an anionic surfactant or dispersant.

The phosphorus acid functional polymer component may comprise phosphorus acid groups in the amount of from 0.03 to 5 wt. %, preferably, up to 3.0 wt. %, or 1 wt. % or more, or 2.0 wt. % or less based on the dry weight of the binder component. If the phosphorus acid group content is less than 1 wt. % of the phosphorus acid functional polymer component comprises phosphorus acid groups, the composition may dry more slowly than is desired.

Suitable phosphorus acid functional polymers additionally comprise, as polymerized units, from 0 to 10 wt. % of α,β-ethylenically unsaturated aliphatic carboxylic (di)acid or anhydride monomers, amides thereof, salts thereof, or α,β-ethylenically unsaturated aldehyde monomers, based on the dry weight of the binder polymer for example, up to 2.5 wt. %, and, preferably, 0.1 wt. % or more. Phosphorus acid functional polymers formed by condensation polymerization may comprise from 0 to 10 wt. % of carboxylic acid or anhydride functional groups, amides thereof, or salts thereof, or aldehyde functional groups, based on the dry weight of the binder polymer.

Suitable phosphorus acid functional polymers may further contain, as polymerized units, from 0% to 5.0 wt. %, such as, 0.1 wt. % or more, or, preferably, up to 3.0 wt. %, as polymerized units, of one or more multi-ethylenically-unsaturated monomer, based on the total weight of monomers used to make the polymer. Maintaining a sufficiently low level of crosslinking helps to ensure that, in the case of emulsion polymers, effective film formation is not compromised.

In embodiments where the polyfunctional amine component and the phosphorus acid functional polymer component are part of the same copolymer, the phosphorus acid functional polymer may further contain, as polymerized units, up to 10 wt. %, for example, up to 7.5 wt. %, and, preferably, 0.1 wt. % or more, or, preferably, up to 5.0 wt. %, based on the dry weight of the binder component, of one or more mono-ethylenically unsaturated amine-group functional monomer.

One example of a phosphorus acid functional polymer comprises an addition copolymer formed from, as polymerized units, 0.05 to 5 wt. %, based on the dry weight of the binder component, of one or more ethylenically unsaturated phosphorus acid monomer, as well as polymers having pendant phosphorus acid groups, i.e. covalently linked to the polymer backbone. One example of a suitable phosphorus acid functional polymer may include, for example, polymeric binders having as copolymerized units 55 wt % butyl acrylate, 2.6 wt % phosphoethyl methacrylate, and 42.4 wt % methyl methacrylate, prepared according to the methods of the U.S. Patent Publication No. 2005/0222299 A.

Preferably, the phosphorus acid functional copolymers are polymerized from i) one or more mono-ethylenically unsaturated phosphorus acid monomer or copolymerizable ethylenically unsaturated polymer with pendant phosphorus acid groups, ii) one or more nonionic mono-ethylenically unsaturated monomer chosen from (meth)acrylic, styrene/(meth)acrylic, or vinyl acetate/acrylic monomers, iii) one or more mono-ethylenically unsaturated carboxylic acid or anhydride monomer, or salt thereof, and, optionally, (iv), one or more mono-ethylenically unsaturated amine-group containing monomer.

Suitable mono-ethylenically unsaturated phosphorus acid monomers for making the phosphorus acid functional polymer may be in the acid form or as a salt of the phosphorus acid groups. Examples of suitable mono-ethylenically unsaturated phosphorus acid monomers include any of the following formulae:

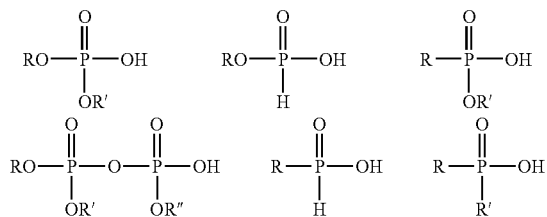

wherein R is an organic group containing an acryloxy, methacryloxy, or a vinyl group; and R' and R" are independently selected from H and a second organic group. The second organic group may be saturated or unsaturated.

Suitable mono-ethylenically unsaturated phosphorus acid monomers include dihydrogen phosphate-functional monomers such as dihydrogen phosphate esters of an alcohol in which the alcohol also contains a polymerizable vinyl or olefinic group, such as allyl phosphate, mono- or diphosphate of bis(hydroxy-methyl)fumarate or itaconate, derivatives of (meth)acrylic acid esters, such as, for examples phosphates of hydroxyalkyl (meth)acrylates including 2-hydroxyethyl (meth)acrylate, 3-hydroxypropyl (meth)acrylates, and the like. Other suitable mono-ethylenically unsaturated phosphorus acid monomers include phosphonate-functional monomers, such as vinyl phosphonic acid, allyl phosphonic acid, 2-acrylamido-2-methylpropanephosphonic acid, -phosphonostyrene, 2-methylacrylamido-2-methylpropanephosphonic acid. Further suitable mono-ethylenically unsaturated phosphorus functional monomers are 1,2-ethylenically unsaturated (hydroxy)phosphinylalkyl (meth)acrylate monomers, such as (hydroxy)phosphinylmethyl methacrylate. Preferred mono-ethylenically unsaturated phosphorus acid monomers are dihydrogen phosphate monomers, which include 2-phosphoethyl (meth)acrylate, 2-phosphopropyl (meth)acrylate, 3-phosphopropyl (meth)acrylate, and 3-phospho-2-hydroxypropyl (meth)acrylate.

In one embodiment, phosphorus acid functional polymers containing pendant phosphorus acid groups or addition comonomers used to make or such polymers containing pendant phosphorus acid groups are prepared by preparing a precursor polymer containing a pendant first co-reactive group which can be reacted with a compound containing a second co-reactive group and a phosphorus acid group. Suitable first co-reactive groups on the precursor polymer are hydroxyl, epoxy, acetoacetoxy and isocyanate groups. For example one can prepare a precursor polymer using hydroxy alkyl (meth)acrylate, glycidyl (meth)acrylate, acetoacetoxy (meth)acrylate, or a,a-dimethyl meta isopropenyl benzyl isocyanate. Suitable second co-reactive groups on the compound including a second co-reactive group and phosphorus acid group are amine, hydroxyl, and phosphoric acid anhydride. Alternatively, a hydroxyl functional precursor polymer can be reacted with polyphosphoric acid to generate the organic polymer with internal pendant phosphorus acid groups. Thus, an isocyanate or acetoacetoxy functional precursor polymer can be reacted with an amine functional phosphonate such as glyphosate, to generate the organic polymer with internal pendant phosphorus acid groups. The resulting polymer may, if terminally mono-ethylenically unsaturated, be further copolymerized with one or more comonomer chosen from mono-ethylenically unsaturated nonionic monomers, mono-ethylenically unsaturated carboxylic acid monomers, mono-ethylenically unsaturated amine monomers, and mixtures thereof.

Suitable mono-ethylenically unsaturated carboxylic acid, anhydride or amide monomers for making phosphorus acid functional copolymers may include, for example, ethylenically unsaturated carboxylic acid monomers, such as, for example, acrylic acid, methacrylic acid, crotonic acid, itaconic acid, fumaric acid, maleic acid, maleic anhydride, monomethyl itaconate, monomethyl fumarate, monobutyl fumarate, and maleic anhydride; salts thereof, e.g. sodium acrylic acid; (meth)acrylamide, substituted (meth)acrylamides, such as N-alkyl (meth)acrylamides and N,N-dialkyl (meth)acrylamides; and N-methylol (meth)acrylamide. Preferred mono-ethylenically unsaturated carboxylic acid monomers are (meth)acrylic acid, itaconic acid, fumaric acid and maleic acid.

Suitable mono-ethylenically unsaturated monomers for making phosphorus acid functional addition copolymers may include monomers such as, for example, (meth)acrylic ester monomers including, for example, $C_1$ to $C_{30}$ (cyclo)alkyl (meth)acrylates, such as, for example methyl (meth)acrylate, ethyl methacrylate, butyl (meth)acrylate, 2-ethylhexyl (meth)acrylate, decyl acrylate, lauryl (meth)acrylate, isodecyl (meth)acrylate; (meth)acrylamide, substituted (meth)acrylamides, such as N-alkyl (meth)acrylamides and N,N-dialkyl (meth)acrylamides; ethylene; propylene; styrene and substituted styrenes; butadiene; vinyl esters, such as vinyl acetate and vinyl butyrate; vinyl chloride, vinyl toluene, and vinyl benzophenone; (meth)acrylonitrile; and vinylidene halides, such as, vinylidene chloride. Preferably, the phosphorus acid functional addition copolymers are formed from butyl acrylate, ethyl acrylate, ethylhexyl (meth)acrylate, methyl (meth)acrylate, styrene, styrene and butadiene mixtures, and mixtures thereof.

Suitable amine-functional mono-ethylenically unsaturated functional monomers for making phosphorus acid functional addition copolymers that further comprise a polyfunctional amine component may include, for example, the amine-group containing monomers suitable for making polyfunctional amines, as described below.

Suitable multi-ethylenically unsaturated monomers for making phosphorus acid functional addition copolymers may include, for example, those having two or more ethylenically unsaturated bonds, such as, allyl (meth)acrylate, diallyl phthalate, glycol di(meth)acrylates, such as, for example, 1,2-ethyleneglycol di(meth)acrylate, 1,4-butylene glycol di(meth)acrylate, 1,6-hexanediol di(meth)acrylate; and divinyl benzene.

The polyfunctional amine component may comprise any one or more amine-functional polymer having a weight average molecular weight of 1,000 or more. Accordingly, the polyfunctional amine component may be any one or more polymer chosen from polymers containing pendant amine functionality and vinylamine polymers, hydrophobic polyamine functional emulsion polymers, copolymers thereof further containing phosphorus acid functional groups, and mixtures thereof.

In one embodiment, the polyfunctional amine component comprises one or more polyamine functional polymer with pendant amine-functional groups. Such polymers may comprise, as polymerized units, two or more mono-ethylenically unsaturated monomers, wherein 2.0 wt. % or more, based on total copolymerized monomers in the copolymer, are α,β-ethylenically unsaturated amine-functional monomers. Polyfunctional amines may include, for example, polymers formed from either an amine-group containing monomer, e.g. an aminoalkyl (meth)acrylate, in the amount of up to 100 wt. %, for example, up to 20 wt. %, based on the dry weight of the polyfunctional amine.

In another embodiment, the polyamine functional emulsion polymers having pendant amine-functional groups may also have copolymerized therein phosphorus acid functional groups and, preferably, acid-functional groups; or, the polyamine functional emulsion polymer may be blended with one or more emulsion polymer that has phosphorus acid functional groups.

In another embodiment, the polyfunctional amine component comprises polymers formed by (co)polymerization of one or more vinylamine, or an imine monomer, for example from 20 to 100 wt. % of such a monomer, as polymerized units. Polymers from imine monomers may comprise polyethyleneimine and polyethyleneimine derivative (co)polymers, such as any formed from (cyclo)alkyl, (alkyl)aryl or amine substituted ethylene imine monomer derivatives.

In yet another embodiment, the polyfunctional amine component comprises a hydrophobic polyamine functional emulsion polymer that is a phosphorus acid functional polymer and has, in addition, amine functional groups, thereby doubling as a polyfunctional amine component. Suitable hydrophobic polyamine functional emulsion polymers may be formed from polymerizable monomers including (a) alkyl esters of acrylic or methacrylic acid where the alkyl ester is a $C_1$-$C_{18}$ alkyl ester; (b) from 0.1 to 5 wt. %, based on the total dry weight of the polymer, of at least one secondary or tertiary amino (meth)acrylate monomer, (c) from, 0.05 to 5 wt. %, based on the dry weight of the polymer, of one or more ethylenically unsaturated carboxylic acid monomer and, in addition, one or more phosphorus acid monomer, (d) from 0.1 to 5 wt. Such a hydrophobic polyamine functional emulsion polymer, by itself, may comprise the anionically stabilized binder.

Examples of suitable amine containing monomers for making a polyfunctional amine include aminoalkyl vinyl ether or sulfides; amine containing acrylamide or acrylic esters, such as tert-butylaminoethyl (meth)acrylate, N,N-dimethylaminoethyl (meth)acrylate and N,N-dimethylaminopropyl (meth)acrylate, N-beta-aminoethyl (meth)acrylamide; vinyl imidazoles; N-(meth)acryloxyalkyl-oxazolidines, such as 2-(3-oxazolidinyl)ethyl (meth)acrylate; N-(meth)acryloxyalkyltetrahydro-1,3-oxazines, and monomers that readily generate amines by hydrolysis, such as, for example, acryloxy-ketimines and-aldimines, e.g. 2-[4-(2,6-dimethylheptylidene)-amino]-ethyl methacrylate, and other monomers as disclosed in U.S. Pat. No. 5,804,627. Polymers prepared using imine monomers, e.g. ethylene imine or alkyl substituted ethylene imine, contain no imine functionality and, instead, contain amine functionality as part of the polymer backbone. Suitable polyfunctional amines may include, for example, poly(oxazolidinylethyl methacrylate), poly(vinylamine), and polyalkyleneimine, e.g. poly(ethyleneimine). U.S. Pat. No. 5,672,379 discloses additional suitable polyfunctional amines.

Suitable vinylamine polymers may include, for example, poly(vinylamine) homopolymer, vinylamine copolymers, N-substituted poly(vinylamine) homopolymers, N,N-disubstituted poly(vinylamine) homopolymers, N-substituted vinylamine copolymers, N,N-disubstituted vinylamine copolymers, and combinations thereof. Unsubstituted poly (vinylamine) homopolymer is abbreviated "pVAm", and is interchangeably referred to herein as "poly(vinylamine)" or "poly(vinylamine) homopolymer". Vinylamine copolymers may contain one or more different vinylamine monomer as polymerized units, for example, vinylamines, N-substituted vinylamines, N,N-substituted vinylamines, or combinations thereof. Suitable amounts of vinylamine monomers, present as polymerized units, may range from 20 to 100 mole %, preferably 50 to 100 mole %, and more preferably 80 to 100 mole % of the vinylamine copolymer. Suitable N-substituents of N,N-disubstituted pVAms and N,N-disubstituted vinylamine copolymers include linear, branched, or cyclic alkyl groups having 1 to 6 carbons, β-hydroxyalkyl groups having 1 to 6 carbons, and combinations thereof. Preferred vinylamine polymers are poly(vinylamine) homopolymer, poly (N-methylvinylamine), poly(N-ethylvinylamine), and poly (N-propylvinylamine).

Other polyamine functional polymers include, for example, aminoalkyl vinyl ethers and aminoalkyl vinyl sulfides.

Suitable amounts of the polyfunctional amine component may range from 0.1 to 10 wt. %, based on the total weight of the anionically stabilized binder and the volatile base, preferably 0.2 wt. % or more, or, preferably, 5.0 wt. % or less, and, more preferably, 0.5 wt. % or more or, more preferably, 2.0 wt. % or less. The polyfunctional amine component may be present in the coating composition, such as when it forms part of a phosphorus acid functional polymer, or it may be added as a separate component, e.g. with or without absorber, before, during or after the dispersion composition is applied.

The fast drying aqueous compositions further comprise one or more phosphorus acid surfactant in the acid form or in the salt form, e.g. a phosphate or phosphonate surfactant, such as an alkyl ethoxylated phosphate. The phosphorus acid surfactant may be any compound containing a phosphate, phosphate ester, or phosphonate group and a hydrophobic moiety. One suitable phosphorus acid surfactant is a polyoxyethylene tridecyl ether phosphate.

The alkyl ethoxylated phosphate surfactant may have an $C_8$ to $C_{30}$ alkyl group attached to a polyoxyethylene chain having an average degree of polymerization in the range of from 2 to 100. The alkyl ethoxylated phosphate surfactant may be represented by the structure: R-(EO)$_n$—OPO$_3$X$_2$ wherein R is a $C_8$ to $C_{30}$ alkyl group; EO is a polymerized ethylene oxide unit; n is an integer with a value in the range of from 2 to 100; and each X is independently selected from H or a cation. Examples of suitable cations include alkali metal cations such as lithium, sodium, or potassium; ammonia; and amines such as dimethyl amine, triethanol amine, and methyl amine.

The concentration of the alkyl ethoxylated phosphate surfactant in the aqueous polymer composition is typically in the range from 0.1 to 5 weight %, preferably in the range of from 0.1 to 3 weight %, and more preferably in the range of from 0.5 to 3 weight %, based on the weight of the polymer particles. The alkyl ethoxylated phosphate surfactant may be added to the aqueous binder component copolymer dispersion, added to the aqueous medium prior to or during copolymerization to make the aqueous binder component, or combinations thereof.

In one embodiment, the alkyl ethoxylated phosphate surfactant included in the aqueous polymer composition has a polyoxyethylene chain having an average degree of polymerization in the range of from 5 to 50, and preferably in the range of from 10 to 50. In another embodiment, the alkyl ethoxylated phosphate surfactant has $C_{12}$ to $C_{18}$ alkyl group.

The one or more volatile base, for example, a volatile amine, is present in amounts sufficient to raise the pH to 7.5 or higher and to ensure that the polyfunctional amine component is at least partially in a non-ionic state (deprotonated), i.e. at least 20 mole % of the amine groups in the polyfunctional amine component are deprotonated.

Each of the one or more (co)polymer in the anionically stabilized binder may, independently, comprise one or more single stage copolymer, i.e. made by single stage polymerization, or one or more copolymer of more than one phase, such as, for example, those formed by a multistage emulsion polymerization. Multistage emulsion particles are composed of two or more phases of various geometries such as, for example, core/shell or core/sheath particles, core/shell particles with shell phases partially encapsulating the core, core/shell particles with a multiplicity of cores, and interpenetrating network particles. Multistage emulsion copolymers can be formed in two or more stages, where the stages differ in molecular weight as well as composition.

Each one or more phosphorus acid functional polymer or polyfunctional amine polymer may be prepared such that surfactants, initiators, and other additives are selected independently, i.e. they may be the same or different in kind and amount for each polymer. The polymerization techniques used to prepare aqueous emulsion-copolymers are well known in the art. In the emulsion polymerization process, the phosphorus acid surfactant of the present invention and/or conventional surfactants may be used such as, for example, anionic and/or nonionic emulsifiers such as, for example, alkali metal or ammonium salts of alkyl, aryl, or alkylaryl sulfates, sulfonates or phosphates, e.g. sodium lauryl sulfate, sodium polyoxyethylene lauryl ether sulfate, and the sodium salt of tert-octylphenoxyethoxypoly(39)ethoxyethyl sulfate; alkyl sulfonic acids; sulfosuccinate salts; fatty acids; ethylenically unsaturated surfactant monomers; and ethoxylated alcohols or phenols. The amount of surfactant used is usually 0.1% to 6% by weight, based on the weight of monomer. Either thermal or redox initiation processes may be used. The reaction temperature is maintained at a temperature lower than 100° C. throughout the course of the reaction. Preferred is a reaction temperature between 10° C. and 95° C., more preferably between 20° C. and 90° C. The monomer mixture may be added neat or as an emulsion in water. The monomer mixture may be added in one or more additions or continuously, linearly or not, over the reaction period, or combinations thereof.

Conventional free radical initiators may be used such as, for example, hydrogen peroxide, sodium peroxide, potassium peroxide, t-butyl hydroperoxide, cumene hydroperoxide, ammonium and/or alkali metal persulfates, sodium perborate, perphosphoric acid and salts thereof, potassium permanganate, and ammonium or alkali metal salts of peroxydisulfuric acid, typically at a level of 0.01 % to 3.0% by weight, based on the weight of total monomer. Redox systems using the same initiators coupled with a suitable reductant such as, for example, sodium sulfoxylate formaldehyde, ascorbic acid, isoascorbic acid, alkali metal and ammonium salts of sulfur-containing acids, such as sodium sulfite, bisulfite, thiosulfate, hydrosulfite, sulfide, hydrosulfide or dithionite, formadinesulfinic acid, hydroxymethanesulfonic acid, acetone bisulfite, amines such as ethanolamine, glycolic acid, glyoxylic acid hydrate, lactic acid, glyceric acid, malic acid, tartaric acid and salts of the preceding acids may be used. Redox reaction catalyzing metal salts of iron, copper, manganese, silver, platinum, vanadium, nickel, chromium, palladium, or cobalt may be used. Chelating agents for the metals may optionally be used.

Chain transfer agents, such as, for example, mercaptans, such as alkyl thioglycolates, alkyl mercaptoalkanoates, and $C_4$-$C_{22}$ linear or branched alkyl mercaptans; halogen compounds, including tetrabromomethane; or mercaptocarboxylic acids may be used to control the molecular weight of the phosphorus acid functional copolymer. Chain transfer agent(s) may be added in one or more additions or continuously, linearly or not, over most or all of the entire reaction period or during limited portion(s) of the reaction period. Suitable amounts of chain transfer agents range from 0.01 to 10 wt. %, based on the total weight of monomers.

Any monomer in any polymerization may be added neat, i.e. not as an emulsion in water, or as an emulsion in water. The monomer may be added in one or more additions or continuously, linearly or not, over the reaction period, or combinations thereof.

The fast drying aqueous composition may be formulated to have a solids content of 30 wt. % or more, or, preferably, 40 wt. % or more, or, preferably, 55% solids by volume or more for faster dry, such as, preferably, up to 60wt. %. The aqueous phase of the composition includes water and optionally, one or more water miscible organic solvents, such as, methanol, ethanol, glycols, and glycol ethers.

In formulating fast-drying aqueous compositions, the volatile base is added to the aqueous binder component before adding any polyfunctional amine to insure stability. Preferably, the volatile base is combined with the aqueous binder component as soon as is practicable after polymerization.

The type and amount of volatile base used may be sufficient to raise the pH of the fast-drying aqueous dispersion composition to the point where a desired proportion of the polyfunctional amine component is in a non-ionic state (deprotonated). In the non-ionic state (i.e. deprotonated), polyfunctional amine interaction with the anionically stabilized emulsion and any other anionic ingredients which may be present in the composition is minimized. The volatile base must be volatile enough to be released under air drying conditions. During film formation, the volatile base evaporates with the result that the amine moieties of the polyamine functional polymer become protonated which interact with the anionic ingredients to destabilize the coating composition and thereby accelerate drying. Suitably, from 20 to 100 mole % of the amino groups of the polyfunctional amines may be deprotonated, preferably from 60 mole % or more, more preferably from 80 mole % or more, and most preferably from 90 mole % or more. Accordingly, suitable pH ranges for fast-drying aqueous dispersions may range from 7.5 to 11, preferably 9 or higher, more preferably, from 9.5 to 10.7. Suitable amounts of a volatile base may range from 0.2 to 5 wt. %, based on the total weight of the aqueous binder composition, the polyfunctional amine, and the volatile base. Suitable volatile bases may include any of ammonia, $C_1$-$C_6$ alkyl amines and $C_1$-$C_6$ alkanolamines, such as, for example, butylamine, propylamine, ethylamine, ethylenediamine, trimethyl amine, triethyl amine, diethylamine, diethanolamine, ethanolamine, 2-methylaminoethanol, 2-dimethylaminoethanol, morpholine, and N-methylmorpholine. Preferably, the volatile base is ammonia, or an admixture thereof with other volatile or nonvolatile bases.

In two component fast-drying aqueous compositions, suitable absorbers further increase the drying rate of aqueous binder compositions and can thereby render fast-drying aqueous compositions. The absorber may be combined with the aqueous binder component and volatile base during or after application to a substrate, e.g. while the applied binder composition is still wet.

Suitable absorbers may include organic absorbers, such as, for example, hollow sphere polymers or void containing polymers; ion exchange resins (IER), sumica gel (a copolymer of sodium methacrylate and/or ammonium methacrylate), inorganic absorbents, such as talc, clay, calcium oxide; molecular sieves, such as zeolites; non-porous carbonaceous materials, such as carbon blacks; porous carbonaceous materials, such as activated carbons; and superabsorbent polymers. The average particle size of an absorber may range from 0.05 μm to 5000 μm, preferably, 10 μm or more and, preferably, up to 1500 μm. Suitable amounts of one or more absorber may range from 0.01 wt. % to 90 wt. %, based on the total weight of the coating composition, preferably, 0.1 wt. % or more, or, preferably, up to 70 weight %, or, more preferably, 1 wt. % or more, or up to 30 wt. %.

Coating and traffic paint formulations may contain additional formulation ingredients, such as, for example, thickeners, such as hydroxyethyl cellulose (HEC), fumed silica, and attapulgite clay; rheology modifiers; pigments, such as titanium dioxide, organic pigments, and carbon black; extenders such as calcium carbonate, silicas, and silicates; fillers, such as glass or polymeric microspheres, quartz(ite) and sand; colorants; plasticizers; crosslinking agents; adhesion promoters, such as silanes; tackifiers; coalescents, for example, alkylene glycols; 2,2,4-trimethyl-1,3-pentanediol monoisobutyrate, glycol ethers; dispersants; wetting agents; surfactants; dyes; sequestering agents; preservatives; biocides and mildewcides, such as zinc oxide, isothiazolones, triazoles, and benzotriazoles; anti-freeze agents; slip additives; waxes; freeze/thaw protectors; defoamers, such as silicone-based and mineral oil-based defoamers; corrosion inhibitors; and anti-flocculants.

Thickeners may include any material added to a coating to modify its Theological profile. Preferably, thickeners comprise associative thickeners, such as, for example, hydrophobically-modified, alkali soluble emulsions (HASE), hydrophobically-modified ethylene oxide-urethane polymers (HEUR), and hydrophobically-modified hydroxy ethyl cellulose (HMHEC).

Suitable additional dispersants may include non-ionic, anionic, and cationic dispersants, such as, for example, 2-amino 2-methyl 1-propanol (AMP), dimethyl amino ethanol (DMAE), citric acid and other carboxylic acids; anionic polymers such as, e.g. poly (meth)acrylic acid with various comonomers such as styrene, or alkyl(aryl) (meth)acrylate esters, salts of the aforementioned polymers, as well as mixtures thereof.

One or more surfactant may be used to stabilize the emulsion polymerization systems after polymerization and may be present at levels of from 0.1 to 6 wt. % based on the total weight of monomer in polymerization.

Methods of producing coatings, such as roadway markings on a road surface, may comprise applying onto the substrate or road surface one or more layer of the fast drying aqueous composition and evaporating the volatile base therefrom to provide the traffic marking on the road surface and/or allowing the absorber component to absorb aqueous liquid. Accordingly, methods of forming coatings may comprise applying the fast drying aqueous composition to a substrate and, separately, applying one or more absorber component to the substrate simultaneously with, before, or after the step of application of the fast drying aqueous composition while it is still wet or fluid.

Various application methods are known in the art, including spraying the composition on the road surface using pressurized spray guns, such as, for example truck mounted spray guns supplied with paint via air pressurized tanks or airless pumps. Other methods include applying the composition by hand using a paint brush or a paint roller. Coatings may be applied in one or more layer. Preferably, the substrate is cleaned prior to application to remove any dirt or sediments. Whether it comprises one layer or more than one layer, a suitable thickness of the dried film generally ranges from 100 μm to 600 μm, preferably 200 μm or more, and, preferably, up to 450 μm.

In an embodiment to improve the visibility of the roadway markings, application methods include applying glass beads on the layer of the traffic paint or coating while the layer is still wet to ensure the adhesion of the glass beads to the traffic paint layer or premixing them into the traffic paint prior to application. The glass beads may be applied by known methods, such as, for example, by spraying the glass beads entrained in and conveyed by a jet of air atop the traffic paint layer, or by sprinkling the glass beads from a storage hopper positioned above the applied traffic paint. The amount of glass beads applied on the coating layer may range from 250 to 600 grams per square meter of the coating layer for visibility at night.

The compositions are suitable for coating or forming films on substrates such, as, for example, roads, and traffic control devices such as guardrails and concrete barriers, roof tops, walls, for example, in exterior insulation finishing systems (EIFS), walkways, runways, parking areas, and indoor floors (such as in factories or shopping malls). Typical substrates include, for example, masonry, tar, asphalt, resin, concrete, cement, stone, stucco, tile, polymeric materials, metals, such as aluminum, stainless steel, or carbon steel, and combinations thereof. All of the substrates may already have one or more layers of an existing coating or paint which may be fresh or aged.

EXAMPLES

Test Methods:

Dry Through: The aqueous coating compositions were drawn down on 10 cm×30 cm glass panels using a 0.508 mm (20 mil) opening film caster. The coated panels were immediately placed in a high humidity test chamber supplied by Victor Associates, Inc. (Hatboro, Pa.), maintained at a relative humidity of 90%±3% obtained by filling the bottom of the test chamber with a 1 cm layer of water and adjusting the size of the side port openings accordingly. The coated glass panels were removed from the test chamber at 15 minute intervals to evaluate dry through time. Dry through time is defined as the time it takes for a wet paint to reach a state such that the paint is not distorted by a 90° thumb twist, when the thumb is touching the paint surface, but no pressure is being applied.

Storage Stability: The aqueous coating compositions were placed in sealed 0.25 liter containers and tested for consistency in accordance with ASTM Standard Method D562-01 (Reapproved 2005) by using a Brookfield KU-1+viscometer. The coating compositions were then stored in a sealed circulation oven at 60° C. for 7 or 10 days. The containers were then removed from the oven and allowed to equilibrate at room temperature for one day. The containers were opened, mixed to uniformity with a spatula, and immediately tested again for consistency under the aforedescribed ASTM Method D562. The stored coating passed the storage stability test if the coating composition consistency, as measured in Krebs units (KU), did not increase by more than 10 KUs from an initial measurement made before it was stored in the oven.

Wet Adhesion to Glass: Glass test panels (10 cm×30 cm) were cleaned with consecutive wipes of water and acetone. The aqueous coating compositions were drawn down on the glass panels using a 0.254 mm opening film caster. The applied coating films were allowed to dry at room temperature for 1 day, then exposed to a water mist for 6 hours, and finally removed from the water mist for wet adhesion testing. The surface of the coating films were blotted dry and then a 100 square grid was cut through the films with a razor blade. Pressure sensitive tape (#720 from 3M Company, St Paul, Minn.) was pressed onto the grid area and then pulled off with a steady pull. Tape was applied a second time to the same area and pulled off to remove remaining loose film squares. The number of squares of the dried film remaining on the glass test panel were counted and reported as the % coating remaining. A higher percentage of the coating remaining indicated better wet adhesion. A value of 90% or greater indicated acceptable wet adhesion.

Hiding by Contrast Ratio: The aqueous coating compositions were drawn down on opacity charts (Form 5C, The Leneta Company, Inc.) using a 0.254 mm opening film caster. The charts were air dried in a horizontal position for 7 days in a room kept at 23° C. (73.5° F.)+/−2.0° C. and 50+/−5% relative humidity. A Y-Reflectometer (Paul N Gardner Co., Inc., Pompano Beach, Fla.) with a 45/0 geometry was used to measure the Y component of light reflectance of the XYZ color scale. A 45/0 geometry indicates that the light is incident to the coating at an angle of 45 degrees from normal, and that the scattered light is collected at an angle of 0 degrees from normal. The Y component reflectance was measured three times over the white and the black portions of the coated opacity charts. The contrast ratio was determined by dividing the average Y reflectance over the black section by the average Y reflectance over the white section.

Synthesis Examples

The following polymers in Examples 1, 2 and 3 and Comparatives A, B, C and D were synthesized, respectively from the monomer mixtures shown in the following Table 1A.

TABLE 1A

| | EXAMPLE | | | | |
|---|---|---|---|---|---|
| Ingredient | 1 grams | 2 grams | 3 grams | 4 (for Comparative A & B) grams | 5 (for Comparative C & D) grams |
| DI water | 2250 | 575 | 575 | 2115 | 575 |
| EAES Surfactant[1] | 261.9 | | | 261.9 | 58.2 |
| Surfactant 2[2] | — | 29.1 | 29.1 | | |
| Butyl acrylate | 2835 | 1040 | 1039.6 | 2835 | 630 |
| Benzophenone | | 12.5 | 12.9 | | |
| Methylmethacrylate | 5967 | 916 | 895.2 | 6048 | 1326 |
| Phosphoethyl methacrylate | 102.6 | 22.8 | 36.7 | | 22.8 |

TABLE 1A-continued

| | EXAMPLE | | | | |
|---|---|---|---|---|---|
| Ingredient | 1 grams | 2 grams | 3 grams | 4 (for Comparative A & B) grams | 5 (for Comparative C & D) grams |
| Methacrylic acid | 45 | 10 | 10.1 | 117 | 10 |
| n-Dodecylmercaptan | 112.5 | 10 | 10.0 | 112.5 | 25 |

[1]Ethoxylated C12 alkyl ether sulfate having an average of 4 EO groups per molecule (30% active in water)
[2]Ammonium salt of nonylphenolethoxylate sulfate (60% active in water)

Polymer Synthesis—Example 1

To 3375 g of deionized (DI) water under a nitrogen atmosphere at 89° C. was added 36.9 g EAES surfactant, 14.4 g of ammonium bicarbonate dissolved in 135 g DI water, 22.5 g ammonium persulfate dissolved in 225 g DI water and 344.7 g monomer mixture 1 followed by 135 g of DI water to form a reaction mixture to which the remaining monomer mixture was then added at 86° C. over 80 minutes along with a solution of 13.5 g ammonium persulfate dissolved in 1700 g DI water.

At the end of the polymerization, 45 g ammonium hydroxide in 45 g DI water, 0.05 g $FeSO_4$ in 31.5 g DI water mixed with 0.045 g ethylene diamine tetraacetic acid in 4.5 g DI water, 7.2 g t-butylhydroperoxide in 90 g DI water and 2.8 g isoascorbic acid in 180 g DI water were added at 65° C. to the reaction product. Ammonium hydroxide was added to give a final pH=9.8.

Ammonium hydroxide was added to give a final pH=9.8. To this was added 346.1 g of p(OXEMA), poly(oxazolidinylethyl methacrylate prepared according to the procedure shown in EP0950763A, (26.7% active) and 116.6 g polyoxyethylene tridecyl ether phosphate surfactant dissolved in 450 g DI water. The resulting latex polymer had a solids content of 48.1% and an average particle diameter of 125 nm.

Polymer Synthesis—Example 2

To 700 g of deionized (DI) water under a nitrogen atmosphere at 89° C. was added 4.1 g surfactant 2, 3.2 g of ammonium bicarbonate dissolved in 30 g DI water, 4.0 g ammonium persulfate dissolved in 26.5 g DI water and 80.2 g monomer mixture 2 followed by 25 g of DI water to form a reaction mixture. The remaining monomer mixture was then added at 86° C. over 80 minutes along with 0.03 g $FeSO_4$ dissolved in 19.8 g DI water mixed with 0.03 g ethylenediamine tetraacetic acid dissolved in 3 g DI water, a solution of 4.0 g t-amyl hydroperoxide and 0.7 g surfactant 2 dissolved in 144.2 g DI water and a solution of 3.1 g Isoascorbic acid and 10.5 g ammonium hydroxide dissolved in 135 g DI water.

At the end of the polymerization, 0.29 g t-amylhydroperoxide and 0.15 g surfactant 2 in 29.3 g DI water and 0.9 g isoascorbic acid in 31 g DI water were added at 65° C. to the reaction product. Ammonium hydroxide was added to give a final pH=9.9. To this was added 96.7 g of p(OXEMA) (26.5% active). The resulting latex polymer had a solids content of 51% and an average particle diameter of 127 nm.

Polymer Synthesis—Example 3

To 940 g of deionized (DI) water under a nitrogen atmosphere at 89° C. was added 4.1 g surfactant 2, 3.2 g of ammonium bicarbonate dissolved in 30 g DI water, 5.0 g ammonium persulfate dissolved in 50 g DI water and 80.2 g monomer mixture 3 followed by 25 g of DI water to form a reaction mixture to which the remaining monomer mixture was then added at 86° C. over 80 minutes along with a solution of 3.0 g ammonium persulfate dissolved in 80 g DI water.

At the end of the polymerization, log ammonium hydroxide, 0.01 g $FeSO_4$ in 7 g DI water, 1.6 g t-Butylhydroperoxide in 10 g DI water and 0.6 g Isoascorbic acid in 20 g DI water were added at 64° C. to the reaction product. Ammonium hydroxide was added to give a final pH=9.8. To this was added 96.7 g of p(OXEMA) (26.5% active). The resulting latex polymer had a solids content of 51% and an average particle diameter of 119 nm.

Polymer Synthesis—Comparatives A and B

To 3150 g of deionized (DI) water under a nitrogen atmosphere at 89° C. was added 36.9 g EAES Surfactant, 14.4 g of ammonium bicarbonate dissolved in 250 g DI water, 22.5 g ammonium persulfate dissolved in 300 g DI water and 360.9 g monomer mixture 4 followed by 200 g of DI water to form a reaction mixture to which the remaining monomer mixture was then added at 86° C. over 80 minutes along with a solution of 13.5 g ammonium persulfate dissolved in 1750 g DI water.

At the end of the polymerization, 45 g ammonium hydroxide in 70 g DI water, 0.05 g $FeSO_4$ in 31.5 g DI water mixed with 0.045 g ethylene diamine tetraacetic acid in 4.5 g DI water, 7.2 g t-butylhydroperoxide in 180 g DI water and 2.8 g isoascorbic acid in 300 g DI water were added at 65° C. to the reaction product. Ammonium hydroxide was added to give a final pH=10.0. To this was added 346.1 g of p(OXEMA) (26.7% active). The resulting latex polymer had a solids content of 47.7% and an average particle diameter of 123 nm.

Polymer Synthesis—Comparatives C and D

To 920 g of deionized (DI) water under a nitrogen atmosphere at 89° C. was added 8.2 g EAES Surfactant, 3.2 g of ammonium bicarbonate dissolved in 30 g DI water, 5 g ammonium persulfate dissolved in 50 g DI water and 80.2 g monomer mixture 5 followed by 25 g of DI water to form a reaction mixture to which the remaining monomer mixture was then added at 86° C. over 80 minutes along with a solution of 3 g ammonium persulfate dissolved in 80 g DI water.

At the end of the polymerization, 10 g ammonium hydroxide, 0.01 g $FeSO_4$ in 7 g DI water mixed with 0.01 g ethylene diamine tetraacetic acid in 1 g DI water, 1.6 g t-butylhydroperoxide in 10 g DI water and 0.6 g isoascorbic acid in 20 g DI water were added at 65° C. to the reaction product. Ammonium hydroxide was added to give a final pH=10.6. To this was added 96 g of p(OXEMA) (26.7% active). The resulting latex polymer had a solids content of 51% and an average particle diameter of 118 nm.

Formulations of Polymers of Example 1 and Comparative Examples A and B

Coating formulations of the ingredients were mixed in a plastic 0.946 liter (1 quart) container in the manner set forth in Table 1, below.

TABLE 1

| MATERIAL | Example 1 | Comparatives A | B |
|---|---|---|---|
| Phosphorous monomer (% on total monomer) in coating composition | 2.0 | 0 | 0 |
| Alkyl ethoxylated phosphate surfactant (% active on total polymer solids) in coating formulation | 1.0 | 1.0 | 0 |
| COATING DESCRIPTION | | | |
| Polymer of Example 1 (48.1% solids by weight) | 392.2 | 0 | 0 |
| Polymer of Comparatives A and B (47.7% solids by weight) | 0 | 389.3 | 390.7 |
| [1]Drewplus ™ L-493 Mineral oil based foam control agent | 3.8 | 3.8 | 3.8 |
| [2]Tergitol ™ 15S40 Secondary Alcohol Ethoxylate surfactant (70 wt. % aqueous solution) | 0 | 0 | 2.7 |
| [3]Rhodafac ™ RS-960 polyoxyethylene tridecyl ether phosphate (80 wt. % aqueous solution) | 0 | 2.4 | 0 |
| Water | 0 | 6.9 | 0 |
| PREMIX, then add: | | | |
| Water | 3.9 | 3.9 | 3.9 |
| 28% Ammonium Hydroxide | 1.3 | 1.3 | 1.3 |
| [4]Dequest ™ 2000 Amino tri (methylene-phosphonic acid), (50 wt % aqueous solution) | 3.5 | 3.5 | 3.5 |
| ADD while mixing to maintain a vortex to add materials: | | | |
| Titanium dioxide pigment (rutile; made by chloride process; contains 0 to 4.5% Al(OH)$_3$) | 87.7 | 87.7 | 87.7 |
| Calcium carbonate (ground; mean part size 5.5 μm) | 453.7 | 453.7 | 453.7 |
| DISPERSE FOR 10 MINUTES, THEN ADD THE FOLLOWING WITH GOOD MIXING: | | | |
| Water | 4.6 | 0 | 3.5 |
| Denatured Ethanol | 12.0 | 12.0 | 12.0 |
| 2,2,4-trimethyl-1,3-pentanediol monoisobutyrate | 37.3 | 37.3 | 37.3 |

TABLE 1-continued

| MATERIAL | Example 1 | Comparatives A | Comparatives B |
|---|---|---|---|
| PAINT PROPERTIES | | | |
| STORAGE STABILITY (KU viscosity before/after 10 days at 60° C. storage) | 83/77 | 92/85 | 79.5/ gelled solid |
| DRY THROUGH TIME (minutes) | 45 | 120 | 45 |
| WET ADHESION TO GLASS (% adhering) | 100 | 3 | 30 |
| HIDING (Contrast Ratio) | 0.932 | 0.920 | 0.919 |

[1] Ashland, Inc., Covington, KY.
[2] The Dow Chemical Company, Midland, MI.
[3] Rhodia, Inc, Cranbury, NJ.
[4] Thermphos Trading GmbH, Belgium.

As shown in Table 1, above, the coating formulation containing the coating composition with the combination of a phosphate surfactant and a polymer containing phosphorous monomer (Example 1) has faster dry through time than the coating formulation containing the coating composition without phosphorous monomer (Comparative A). Furthermore, Example 1 has better wet adhesion to glass and hiding than Comparative A. The formulation of Comparative B, without phosphorous monomer or phosphate surfactant, has poor storage stability.

Formulations of Polymers of Examples 2 and 3 and Comparative C

Coating formulations of the ingredients were mixed in a plastic 0.946 liter (1 quart) container in the manner set forth in Table 2, below.

TABLE 2

| MATERIAL | Comparative C | Examples 2 | Examples 3 |
|---|---|---|---|
| % phosphorous monomer (% on total monomer) in coating composition | 0 | 2.0 | 3.2 |
| % alkyl ethoxylated phosphate surfactant (% active on total polymer solids) in coating formulation | 0 | 1.0 | 1.0 |
| COATING DESCRIPTION | | | |
| Anionically stabilized aqueous fast-dry acrylic copolymer binder, polyfunctional amine, volatile base(pH~10; copolymer Tg 18.5° C.; 50.5 wt. % solids) | 273.5 | 0 | 0 |
| Polymer of Example 2 (51.0% solids by weight) | 0 | 254.7 | 0 |
| Polymer of Example 3 (51.0% solids by weight) | 0 | 0 | 255.5 |
| [1] Drewplus ™ L-493 Mineral oil based foam control agent | 3.3 | 3.4 | 3.4 |
| Acrylic dispersant (ammonium salt of poly-methacrylic acid; 30 wt. % aqueous solution) | 3.0 | 0 | 0 |
| Acrylic dispersant (sodium salt of poly-methacrylic acid/ acrylic acid copolymer 35 wt. % aqueous solution) | 0 | 3.4 | 3.4 |
| Water | 0 | 31.1 | 31.0 |
| [2] Surfynol ™ CT-136 Proprietary acetylenic surfactant blend | 1.7 | 1.7 | 1.7 |
| ADD while mixing to maintain a vortex to add materials: | | | |
| Titanium dioxide pigment (rutile; made by chloride process; contains 0 to 4.5% Al(OH)$_3$) | 60.0 | 60.0 | 60.0 |
| Calcium carbonate (ground; mean part size 5.5 μm) | 455.1 | 0 | 0 |
| Nepheline syenite (ground; mean part size 7.5 μm) | 0 | 414.0 | 414.0 |
| DISPERSE FOR 10 MINUTES, THEN ADD THE FOLLOWING WITH GOOD MIXING: | | | |
| Methanol | 18.0 | 18.0 | 18.0 |
| 2,2,4-trimethyl-1,3-pentanediol monoisobutyrate | 13.8 | 6.5 | 6.5 |
| Water | 9.6 | 9.0 | 9.4 |
| 2-hydroxyethyl cellulose aqueous solution (2% solids by weight; Viscosity Type HR: A 1% aqueous solution has a viscosity of 1,500 to 2,500 cps) | 5.0 | 7.4 | 7.0 |
| PAINT PROPERTIES | | | |
| STORAGE STABILITY (KU viscosity before/after 10 days at 60° C. storage) | 84.1/89.1 | 76.6/77.2 | 76.4/73.6 |
| DRY THROUGH TIME (minutes) | 45 | 30 | 45 |

TABLE 2-continued

|  |  | Examples | |
| --- | --- | --- | --- |
| MATERIAL | Comparative C | 2 | 3 |
| WET ADHESION TO GLASS (% adhering) | 4 | 98 | 97 |
| HIDING (Contrast Ratio) | 0.915 | Not tested | 0.943 |

[1]Ashland, Inc., Covington, KY.
[2]Air Products and Chemicals, Inc., Allentown, PA.

As shown in Table 2, above, the coating formulation containing the coating composition with the combination of a phosphate surfactant and a polymer containing phosphorous monomer (Example 3) has equal dry through time than the coating formulation containing a commercial fast dry polymer (Comparative C) and much better wet adhesion to glass and hiding.

The coating formulation containing the coating composition with the combination of a phosphate surfactant and a polymer containing a lower amount of phosphorous monomer (Example 2) has better dry through time than the coating formulation containing a commercial fast dry polymer (Comparative C) and also much better wet adhesion to glass.

Formulations of Polymer of Example 4

Coating formulations of the ingredients were mixed in a plastic 0.946 liter (1 quart) container in the manner set forth in Table 3, below.

As shown in Table 3, below, all of the coating formulations containing the coating composition with the polymer containing phosphorous monomer (Polymer Example 4) have fast dry through times, but only the coating formulations comprising Polymer Example 4 and phosphate surfactant (Examples 4 and 5 in Table 3) have good storage stability.

TABLE 3

|  | Examples | | Comparatives | |
| --- | --- | --- | --- | --- |
| MATERIAL | 4 | 5 | D | E |
| % phosphorous monomer (% on total monomer) in coating composition | 2.0 | 2.0 | 2.0 | 2.0 |
| % alkyl ethoxylated phosphate surfactant (% active on total polymer solids) in coating formulation | 1.0 | 1.0 | 0 | 0 |
| COATING DESCRIPTION | | | | |
| Polymer of Example 4 (51.0% solids by weight) | 292.1 | 292.1 | 292.1 | 292.1 |
| [1]Drewplus ™ L-493 Mineral oil based foam control agent | 3.0 | 3.0 | 3.0 | 3.0 |
| [2]Tergitol ™ 15S40 Secondary Alcohol Ethoxylate surfactant (70 wt. % aqueous solution) | 0 | 0 | 2.1 | 2.1 |
| [3]Rhodafac ™ RS-960 polyoxyethylene tridecyl ether phosphate (80 wt. % aqueous solution) | 1.9 | 1.9 | 0 | 0 |
| Water | 5.6 | 5.6 | 0 | 0 |
| PREMIX, then add: | | | | |
| Water | 3.1 | 0 | 3.1 | 0 |
| 28% Ammonium Hydroxide | 1.1 | 0 | 1.1 | 0 |
| [4]Dequest ™ 2000 Amino tri (methylene-phosphonic acid), (50 wt % aqueous solution) | 2.8 | 0 | 2.8 | 0 |
| Acrylic dispersant (sodium salt of poly-methacrylic acid/acrylic acid copolymer; 35 wt. % aqueous solution) | 0 | 3.4 | 0 | 3.4 |
| ADD while mixing to maintain a vortex to add materials: | | | | |
| Titanium dioxide pigment (rutile; made by chloride process; contains 0 to 4.5% Al(OH)$_3$) | 70.0 | 70.0 | 70.0 | 70.0 |
| Calcium carbonate (ground; mean part size 5.5 µm) | 362.0 | 362.0 | 362.0 | 362.0 |
| DISPERSE FOR 10 MINUTES, THEN ADD THE FOLLOWING WITH GOOD MIXING: | | | | |
| Water | 17.5 | 19.0 | 22.9 | 25.4 |
| Denatured Ethanol | 9.6 | 9.6 | 9.6 | 9.6 |
| 2,2,4-trimethyl-1,3-pentanediol monoisobutyrate | 29.8 | 29.8 | 29.8 | 29.8 |

TABLE 3-continued

|  | Examples | | Comparatives | |
|---|---|---|---|---|
| MATERIAL | 4 | 5 | D | E |
| PAINT PROPERTIES | | | | |
| STORAGE STABILITY (KU viscosity before/after 7 days at 60° C. storage) | 88.6/81.2 | 84.1/79.5 | 85.0/gelled solid | 82.0/100 |
| DRY THROUGH TIME (minutes) | 45 | 75 | 30 | 45 |

[1] Ashland, Inc., Covington, KY.
[2] The Dow Chemical Company, Midland, MI.
[3] Rhodia, Inc, Cranbury, NJ.
[4] Thermphos Trading GmbH, Belgium.

We claim:

1. A fast drying aqueous composition comprising:
   (i) one or more anionically stabilized binder having a phosphorus acid functional polymer component having a glass transition temperature (Tg) range of from −30° C. to 60° C. and a polyfunctional amine component;
   (ii) one or more volatile base in an amount sufficient to stabilize the composition by at least partially deprotonating the polyfunctional amine; and,
   (iii) one or more phosphorus acid surfactant.

2. The composition as claimed in claim 1, wherein the amount of the volatile base is sufficient to deprotonate from 20 mole % to 100 mole % of the amine functional groups on the polyfunctional amine component.

3. The composition as claimed in claim 1, wherein the one or more phosphorus acid surfactant is an alkyl ethoxylated phosphate.

4. The composition as claimed in claim 1, wherein the phosphorus acid functional polymer component comprises one or more polymer having one or more functional group chosen from carboxylic acids, salts thereof, anhydrides, salts thereof, aldehydes, amides, amine functional groups in addition to any of the foregoing carboxylic acid, carboxylic acid salt, anhydride, anhydride salt, aldehyde, and amide functional groups, mixtures thereof and combinations thereof.

5. The composition as claimed in claim 1, wherein the amounts of phosphorus acid groups in the phosphorus acid functional polymer ranges from 0.05 wt. % or more and up to 5 wt. %, based on the dry weight of the anionically stabilized binder.

6. The composition as claimed in claim 1, wherein the polyfunctional amine component is one or more polymer chosen from polymers containing pendant amine functionality, polyethyleneimine, polyethyleneimine derivative (co)polymers, and vinylamine polymers, hydrophobic polyamine functional emulsion polymers, copolymers thereof further containing phosphorus acid functional groups, and mixtures thereof.

7. The composition as claimed in claim 1, which is a two component composition comprising, in one component, the anionically stabilized binder, the phosphorus acid surfactant and the one or more volatile base and, in the second component, an absorber component.

8. A method of using the composition as claimed in claim 1 comprising:
   applying the compositions to a substrate; and,
   drying to form a film.

9. A coating made by the method as claimed in claim 8.

10. The coating as claimed in claim 9, wherein the coating comprises a roadway marking.

* * * * *